United States Patent [19]

de Nijs

[11] Patent Number: 5,289,461
[45] Date of Patent: Feb. 22, 1994

[54] INTERCONNECTION METHOD FOR DIGITAL MULTIMEDIA COMMUNICATIONS

[75] Inventor: Richard H. J. de Nijs, Raleigh, N.C.

[73] Assignee: International Business Machines Corporation, Armonk, N.Y.

[21] Appl. No.: 989,669

[22] Filed: Dec. 14, 1992

[51] Int. Cl.[5] .......................................... H04L 12/42
[52] U.S. Cl. .................................. 370/58.1; 370/85.12
[58] Field of Search .................. 370/16, 53, 54, 58.1, 370/62, 79, 85.1, 85.13; 340/825.03; 379/158, 165, 202, 204, 205, 258, 60, 67, 85.12

[56] References Cited

U.S. PATENT DOCUMENTS

| | | | |
|---|---|---|---|
| 4,679,191 | 7/1987 | Nelson et al. | 370/84 |
| 4,710,917 | 12/1987 | Tompkins et al. | 370/62 |
| 4,797,877 | 1/1989 | Pope et al. | 370/62 |
| 4,811,334 | 3/1989 | Matt | 370/62 |
| 4,931,950 | 6/1990 | Isle et al. | 364/513 |
| 4,975,906 | 12/1990 | Takiyasu et al. | 370/85.13 |
| 5,014,267 | 5/1991 | Tompkins et al. | 370/62 |
| 5,027,400 | 6/1991 | Baji et al. | 380/20 |
| 5,067,127 | 11/1991 | Ochiai | 370/58.1 |
| 5,091,849 | 2/1992 | Davis et al. | 395/100 |

OTHER PUBLICATIONS

An Advanced Multimedia TDM System Architecture, Electrical Communication Laboratory Technical Journal vol. 36, No. 11, pp. 1435-1443, Aoyama et al.

Primary Examiner—Benedict V. Safourek
Attorney, Agent, or Firm—Stephen T. Keohane

[57] ABSTRACT

A network controller for dynamically rearranging a LAN to guarantee bandwidth required for multimedia communications comprises a switch for being connected to the transmit and receive ports of each LAN station and a switch controller. The switch comprises an internal switching fabric such that any receive port can be connected to any transmit port of any of the stations. The switch controller, which is connected to the primary LAN, controls the switch so that the LAN may be dynamically reconfigured when, for instance, a LAN node wishes to establish a private session with another LAN node. The request from the node to the controller is sent in a packet being passed around the primary ring. After the data transfer is complete between the two stations and they wish to re-enter the primary ring, one of the stations issues a request to the network controller to reconfigure the network. The request is made by applying a DC voltage to one of the node's receive or transmit line pairs. The network controller detects this signal with DC detection circuitry and reconfigures the network accordingly.

20 Claims, 6 Drawing Sheets

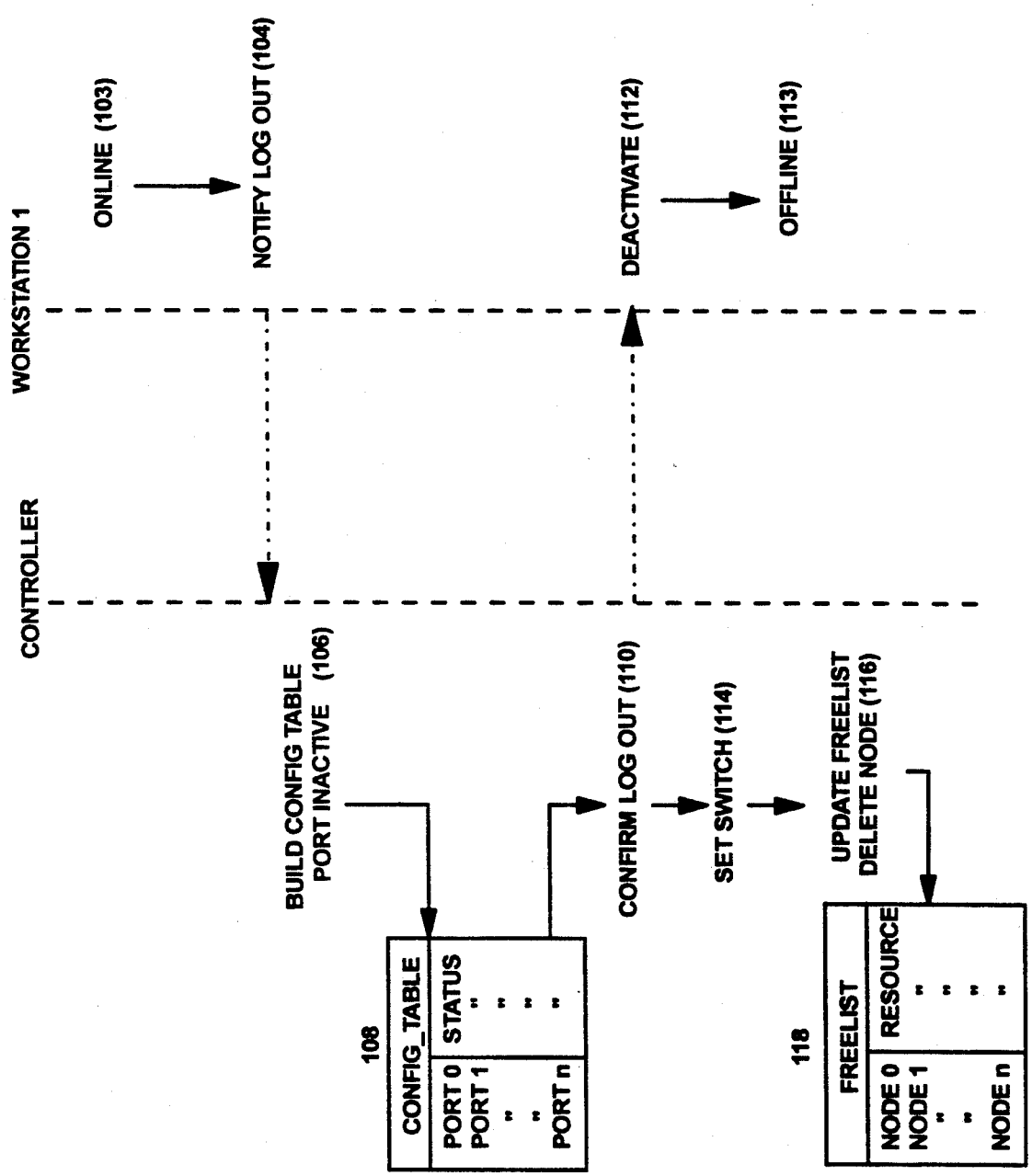

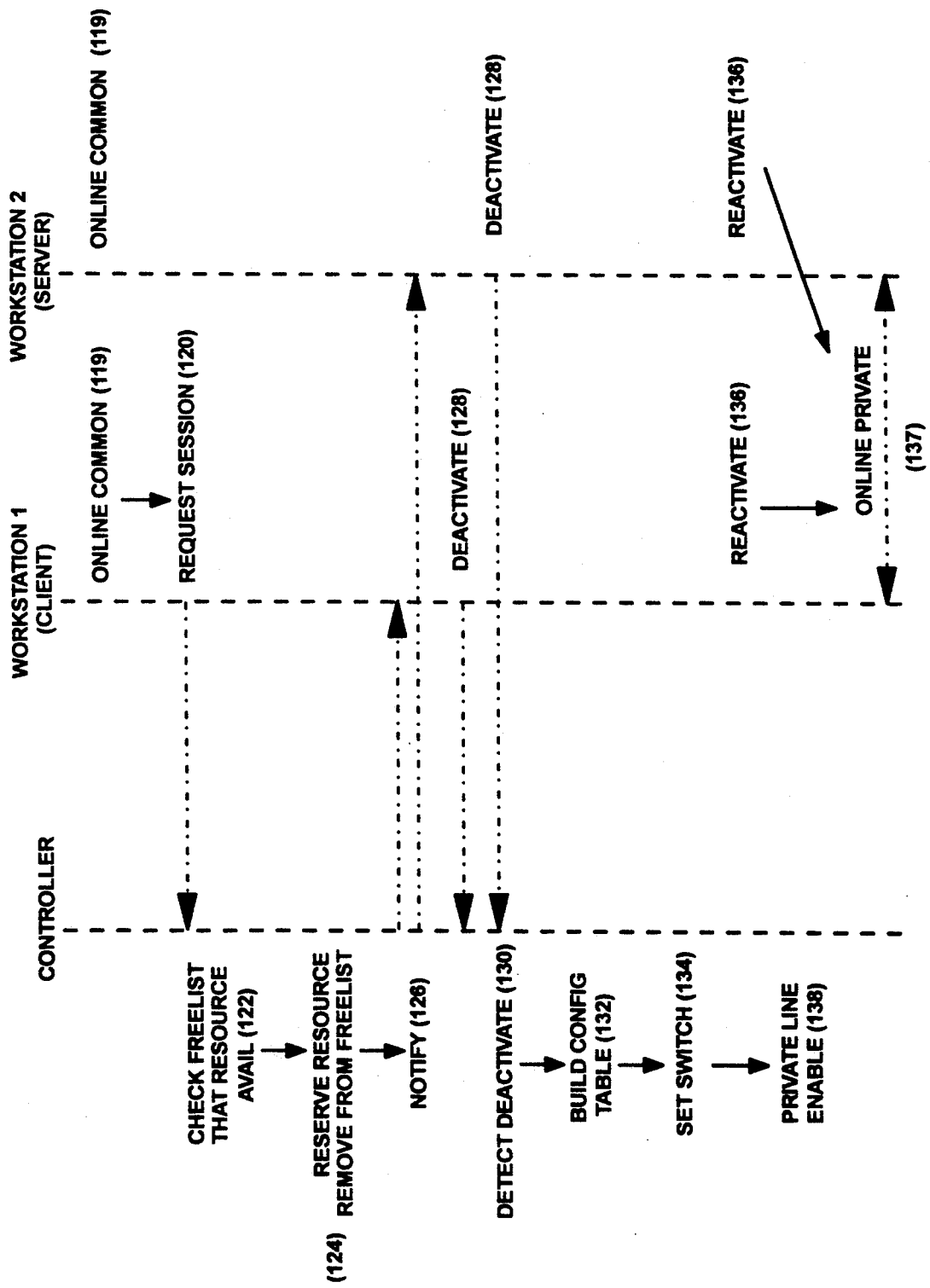

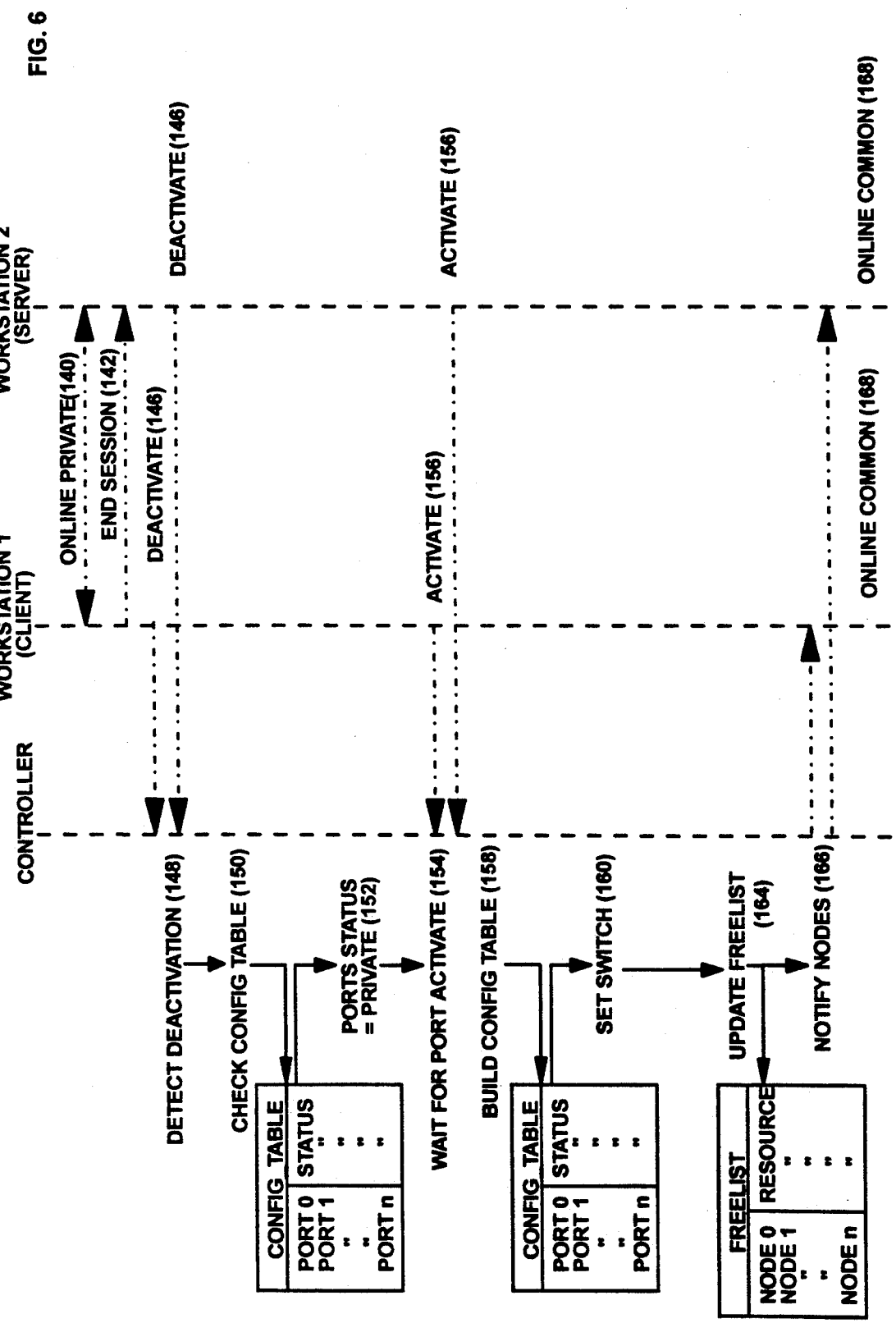

INTERCONNECTION METHOD FOR DIGITAL MULTIMEDIA COMMUNICATIONS

BACKGROUND OF THE INVENTION

I. Field of the Invention

The present invention relates to dynamic configuration of local area networks (LANs) and, more particularly, to a method of LAN configuration to enable full-bandwidth communications among selected computing equipment. In addition, the invention concerns an apparatus and method for allocating private connections via a LAN switching mechanism.

II. Background of the Invention

In today's complex computing and data communications environments, there is an ever-growing need for high-speed data transfer. For example, image (video) transmission requires a vast amount of data to be transmitted across a network and drives the need for high-speed data transfer. Image transmission is required in tools such as computer-aided engineering software, for such applications as solid modeling, computer-aided electronic design, and visualization. Even greater network performance is necessary where video and audio information are transmitted across networks in applications such as teleconferencing, education, marketing, news, and entertainment.

Of particular interest are those network applications which are primarily client/server sessions (such as in a local area network (LAN)), with audio and image streams being continuously transmitted from the server to the client. In most of today's network systems, the video and audio data transfer requires a large amount of the available network transmission bandwidth, leaving little bandwidth for other sessions.

Data compression is one method of freeing up some of the bandwidth absorbed by the video/audio data transfer (real-time compression is available today at 160:1) but inherently results in a loss of at least some data. In many applications, lossy compression is tolerable. Other applications can tolerate only lossless compression, thereby requiring exclusive use of a substantial portion of the available transmission bandwidth.

For example, although both Ethernet (10 Mbps) and Token Ring (4/16 Mbps) LANs can transmit compressed image, neither network can sustain more than a handful of live-running video sessions. Indeed, some applications that require high-quality image may necessitate the dedication of the complete LAN bandwidth to a single user. Thus, given current LAN topologies, those with multiple units attached on a bus or a ring, it is conceivable that several multimedia users could consume the entire bandwidth, thereby creating performance problems with other traffic on the network.

Another method of providing the necessary bandwidth is to utilize higher-speed technology. For instance, the Fiber Distributed Data Interface (FDDI) increases the LAN transmission capability from 16 Mbps to 100 Mbps (raw capacity). Further, FDDI-2 offers time multiplexing to reduce the protocol overhead. FDDI and FDDI-2 are, however, expensive to install, especially where the network components are already established.

Another method of guaranteeing bandwidth is limiting the amount of video data transmitted by reducing the image size or the number of frames per second being transmitted. This solution is acceptable for only niche applications. The primary problem with reducing size is that of comprehending the image. Historically, frame speeds below cinematographic or NTSC standards have been shown to be ineffective and unusable.

Another approach to guaranteeing full bandwidth to end users is the use of what is called an "intelligent hub". This network device connects each user with a dedicated LAN interface, for example, an Ethernet bus, which results in each user being assured free use of the available LAN bandwidth, 10 Mbps in this example. Data is transferred from one user to another via bridging. The bridging process, however, introduces delays (latency) that are detrimental to some multimedia applications. In addition, although an intelligent hub may be somewhat effective in that existing cable media and terminal communications adapters can be used, the cost for these devices can be prohibitive.

Reconfiguration of a network, which can be accomplished by rearranging the interconnections on a LAN, for example, is a method of providing necessary LAN bandwidth for its corresponding LAN stations. For example, if performance is poor, the network may be divided into two or more "subLANs" and then interconnected with a bridge. In this way, each subLAN has the maximum LAN bandwidth and, therefore, each station has less competition for the available bandwidth.

In a Token Ring network, this reconfiguration is accomplished by rearranging the connections at the multistation access units (MAUs) which are utilized to provide the appropriate connectivity. Presently, however, this process must be done manually and is, by no means, dynamic.

The challenge is to develop a method to manage the bandwidth of a low-cost network that will permit multimedia (audio/video) communications along with other, less demanding traffic.

SUMMARY OF THE INVENTION

1. Objects of the Invention

The primary object of this invention is to provide an apparatus and method for allocating bandwidth on LANs, such as Ethernet (CSMA/CD, IEEE 802.3) or Token Ring (IEEE 802.5), that effectively, yet economically, enables multimedia communications.

Another object is to provide an apparatus and method for dynamically reconstructing network configurations and for assuring optimal network performance.

Another object is to provide a method of establishing point-to-point connections by reconfiguration of the local area network to enable isochronous communication between two computing devices.

Yet another object is to provide a method of managing the dynamic reconfiguration of the network.

These objects of the invention are given only by way of example. Thus, other desirable objects achieved or advantages obtained by the invention may be perceived by those skilled in the art.

2. Summary of the Invention

The above and other objects are achieved by the invention, which comprises in a preferred embodiment a network controller apparatus for dynamically rearranging a LAN to guarantee bandwidth required for multimedia communications. The network controller comprises a switch connected to the transmit and receive ports of each LAN station and to a switch controller. The switch comprises an internal switching fabric such that any receive port can be directly connected to any transmit port of any of the stations. The switch controller has a microprocessor for providing network control, a memory for providing storage, a LAN interface for providing access to the LAN, a switch control unit for providing control signals to the switch, and DC detection circuitry for detecting signals from each of the stations. In operation, the network controller of the present invention initially configures the network in a single, common ring comprising the stations and the network controller, wherein normal LAN activity occurs. When a station requires additional bandwidth for data transmission with another station such that it cannot share the common ring bandwidth with the remaining stations, it sends a request to the controller requesting a different LAN configuration. For example, a station may request to be temporarily removed from the primary ring for exclusive communication with another station thereby having use of the full LAN bandwidth of the new "subLAN". This request is normally sent in a packet being passed around the common ring. After the data transfer is complete between the two stations and they wish to re-enter the common ring, one of the stations issues a request to the network controller to reconfigure the network. Because the stations are out of the common ring, the station makes the request by applying a DC voltage to one of its receive or transmit line pairs. The network controller detects this signal with its DC detection circuitry and reconfigures the network accordingly.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 4 is a flow chart showing the network log-off process.

FIG. 5 is a flow chart showing the private session establishment process.

FIG. 6 is a flow chart showing the private session break process.

DETAILED DESCRIPTION OF THE PREFERRED EMBODIMENT

Figure 1:
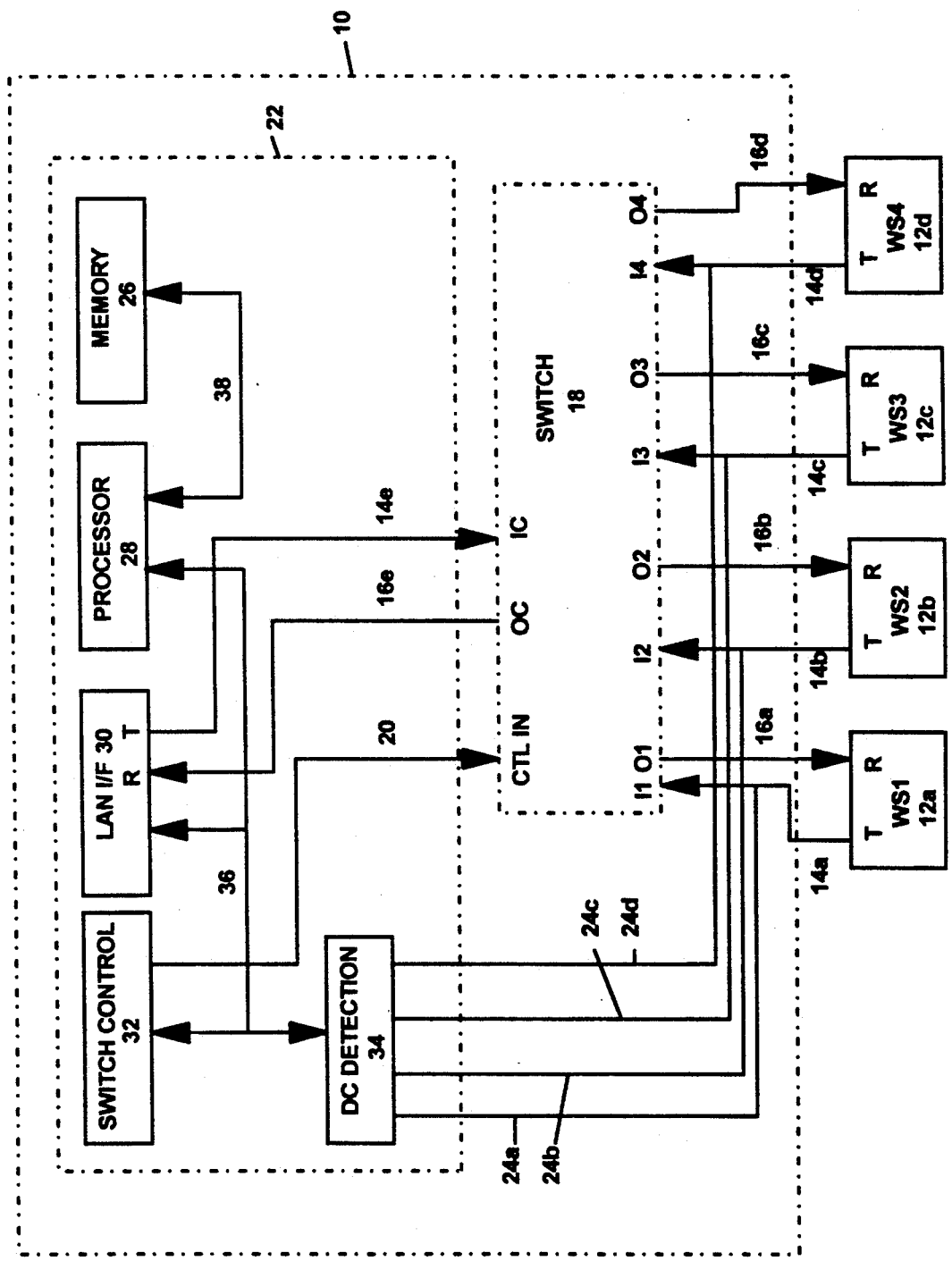
FIG. 1 is a block diagram showing the network controller of the present invention with a plurality of workstations connected thereto.

Following is a detailed description of an interconnection method for digital multimedia communications, reference being made to the drawings in which like-reference numerals identify the elements of structure in each of the several figures. All examples are based on Token Ring (IEEE 802.5) networks although the network controller of the present invention could be utilized as effectively in other types of networks such as, for instance, an Ethernet network.

FIG. 1 shows a diagram of a network consisting of a network controller 10 of the present invention and workstations 12a, 12b, 12c and 12d (WS1 through WS4) connected thereto. Each workstation has two ports, a transmit port (T) and a receive port (R), for being connected to the network controller via LAN lines 14a, 16a, 14b, 16b, 14c, 16c, 14d and 16d. The ports of the workstations are attached to ports of the controller 10 (in contrast to being attached to a multistation access unit (MAU) as they are today).

Controller 10 comprises a switching device 18 having a plurality of input ports, in this case, five, (I1 through I4, Ic) and a plurality of output ports (O1 through O4, Oc). Each of input ports I1 through I4 is connected, respectively, to a transmit port (T) of one of the workstations WS1 through WS4. Likewise, each of the four output ports O1 through O4 is connected to a receive port (R) of one of the workstations WS1 through WS4. The remaining two ports Ic and Oc are used to allow the network controller access to the network.

Switching device 18 has an internal switching fabric so that any of the input ports (I1 through I4, Ic) may be connected to any of the output ports (O1 through O4, Oc). An example of such a switching device is the well-known non-blocking cross-bar switch. Control of the switching device 18 is provided by control lines 20 connected to the CTL IN port.

Network controller 10 further consists of a switch controller 22 which controls the configuration of the switch 18. The switch controller 22 is connected to the network via lines 14e and 16e. In addition, switch controller 22 is connected to LAN lines 14a, 14b, 14c and 14d via DC detection lines 24a, 24b, 24c and 24d.

Switch controller 22 consists of a memory 26 for providing local storage, a processor 28 for providing processing capability, a LAN interface (LAN I/F) 30 for providing an interface to the LAN, a switch control unit 32 for providing the control signals to switch 18 and a DC detection unit 34 for detecting any DC variations on LAN lines 14a, 14b, 14c and 14d. Processor 28, LAN I/F 30, switch control unit 32 and DC detection unit 34 are interconnected by an internal common bus 36. Processor 28 and memory 26 are interconnected by a separate bus 38.

As noted, processor 28 provides the intelligence for the network controller 10. It has the capability of communicating via the LAN I/F 30 with all nodes active on the common ring. It also provides management and control of switch 18 via switch control unit 32. Through DC detection unit 34, the processor 28 can detect DC voltage variations issued from the workstations for communication purposes. This will be discussed in greater detail below.

Memory 26 is utilized by providing local storage for the processor of control programs, switch configuration tables, etc.

LAN I/F 30 has a receive (R) port and a transmit (T) port and is connected to switch 18 via lines 14e and 16e. LAN I/F 30 acts as the LAN interface between the common, primary LAN and the processor 28. LAN I/F 30 is always placed by the switch into the LAN network as a common ring node.

Switch control unit 32 receives commands from the processor 28 and translates these commands into switch control signals which sent to the switch 18 via control lines 20.

The DC detection unit 34 is used to detect DC voltage variations from the workstations WS1 through WS4. In the past, a DC voltage variation from a workstation to the MAU energized a relay in the MAU which physically connected workstation into the ring, i.e., the transmit and receive ports of the workstation were physically connected to the appropriate transmit and receive ports of the directly adjacent workstations, or nodes. In particular, a +5 vDC signal ("OPEN" command) was generated by the workstation token ring adapter and sent to the MAU. This signal provides the energy to activate the relay in the MAU that places the node actively into the network.

Instead, in the present invention, the DC voltage variation from a workstation is detected by the DC detection unit 34 and is conveyed to the processor 28 via common bus 36. The DC variation, in this case, represents a soft request to the network controller 10 for changing the network configuration so that the workstation is entered into the common ring. The DC variation is used by the workstation in two instances. First, the workstation uses it initially to enter the common ring. Second, after the workstation has been taken of the common ring, it generates the Dc offset to re-enter the common ring as it has no other method of communicating with the network controller 10. In the particular embodiment, the +5 vDC signal from the workstation adapter is detected by the DC detection unit 34, conveyed to the processor 28, and interpreted as a request from the workstation to be placed back into the primary, common ring.

In operation, the network controller 10 detects, via DC detection unit 34, +5 vDC offset signals on the workstation transmit LAN lines of those workstations wishing to enter the common ring. The network controller 10 then configures the network in a single, primary ring having each of the workstations WS1 through WS4 and the network controller 10 as stations on the primary ring. This is accomplished by configuring switch 18 such that the input port for a first workstation (I1 for WS1, for example) is connected to the output port of the next workstation (O2 for WS2). An example of how switch 22 could be initially configured for the sample network is detailed in Table 1 below, wherein Port 1 is connected to Port 2 within switch 18:

TABLE 1

| Port 1 | Port 2 |
|--------|--------|
| I1 | O2 |
| I2 | O3 |
| I3 | O4 |
| I4 | Oc |
| Ic | O1 |

(As noted above, switch 18 is controlled via control lines 20 from switch control unit 32.) In this switch configuration, each workstation WS1 through WS4 and switch controller 22 is on the primary Token Ring network.

The processor 28 maintains, in memory 26, a map of the port input and output connections and the switch internal connections. These tables, and other tables maintained by the processor 28, will be discussed in greater detail below.

Where one workstation wishes to transmit data to or receive data from another workstation and requires more bandwidth than is available by sharing the primary ring with the remaining workstations, the network can be reconfigured by the network controller 10. An example of this type of situation is where one workstation is a client and the second workstation is a server, with audio and image data streams need to be continuously transmitted, for a period of time, between the server and the client.

The workstation requiring network reconfiguration issues a request to the network controller 10 in a message using the associated networking protocol. The message (or messages) to the network controller 10 specifies with which workstation (or workstations) an isolated ring needs to be established. For example, when WS1 needs to exclusively communicate with WS2, WS1 sends a message to the network controller 10 requesting the corresponding network reconfiguration. Upon receipt of the request, the network controller 10 first checks to see if the requested resource is available from a resource availability table and, if so, interrupts the network and reconfigures the switch so that the receive port of the requesting node is connected to the transmit port of the resource and the transmit port of the requesting node is connected to the transmit port of the resource. At this point, the two nodes are connected in a private connection and no longer belong to the common ring. After the two workstations, WS1 and WS2 in this case, have been connected, the network controller resets the rest of the common ring, excluding the point-to-point connection, and updates the resource availability table.

One possibility of a switch configuration using the above example is shown below in Table 2:

TABLE 2

| Port 1 | Port 2 |
|--------|--------|
| I1 | O2 |
| I2 | O1 |
| I3 | O4 |
| I4 | Oc |
| Ic | O3 |

Upon completion of the data transfer between the two now-isolated nodes, i.e, WS1 and WS2 in this example, the requesting node (WS1) modulates its transmit LAN line (14a) with a +5 vDC signal. The DC detection unit 34 detects the +5 vDC variation and conveys this to the processor 28. The processor 28 then reconfigures the network so that the two nodes (WS1 and WS2) are re-entered in the common ring.

Figure 2:
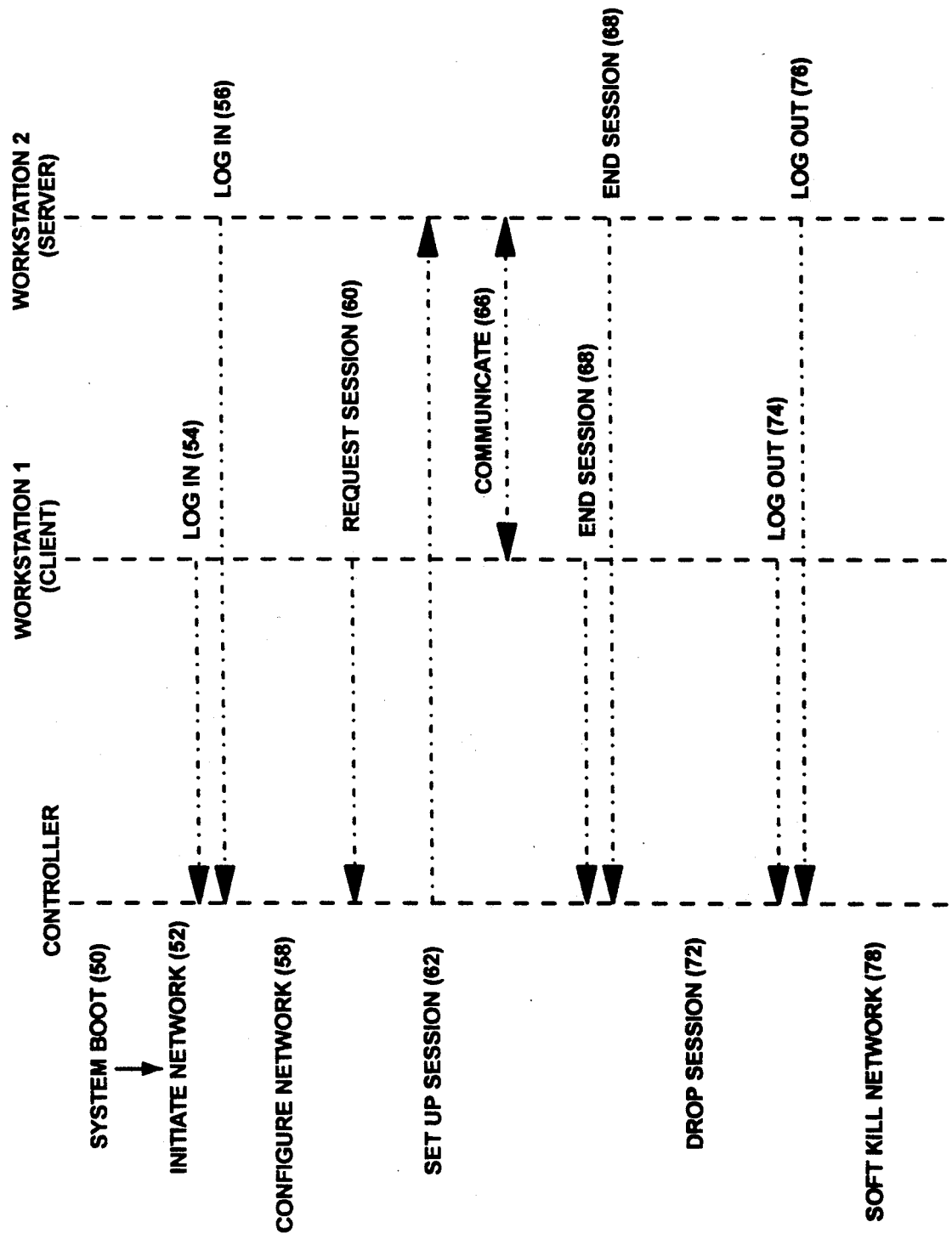
FIG. 2 is a flow chart showing at a high level the network configuration processes.

As discussed above, the processor 28 controls the network configuration (and reconfiguration) process(es). FIG. 2 illustrates a high level flow diagram of network activity. Initially, at 50, the network controller goes through a system boot process for initiating the network. At 52, it initiates the network. This includes such functions as performing diagnostics, setting the initial switch configuration, etc. At 54, workstation 1 (client) logs into the network. As discussed above, this is accomplished by the workstation modulating its transmit LAN line with a +5 vDC signal which is detected by the DC detection unit of the network controller. The network controller logs workstation 1 in for interconnection in the common ring, the details of which are discussed below. At 56, workstation 2 (server) logs into the common ring in the same manner. Although only two workstations are shown, any number of workstations can log on the ring, up to practical limitations. At 58, the network controller configures the network by issuing the proper switch commands to the cross-bar switch. Some time later, at 60, workstation 1 (client) requests a private session with workstation 2 (server), for example, in order that multimedia data be transferred therebetween. At 62, the network controller establishes the session by properly configuring the switch. At 66, the two workstations privately communicate off-line from the common LAN so that the maximum bandwidth can be utilized. At 68, workstations 1 and 2 request that the session be terminated. Again, this is accomplished by the workstations modulating their respective transmit LAN lines with a +5 vDC signal which the network controller detects and acts upon. At 72, the network controller terminates the session and reconfigures the LAN so that workstations 1 and 2 are re-entered therein. At 74 and 76, workstations 1 and 2 log off the network and, at 78, the network controller brings down the common LAN.

Figure 3:
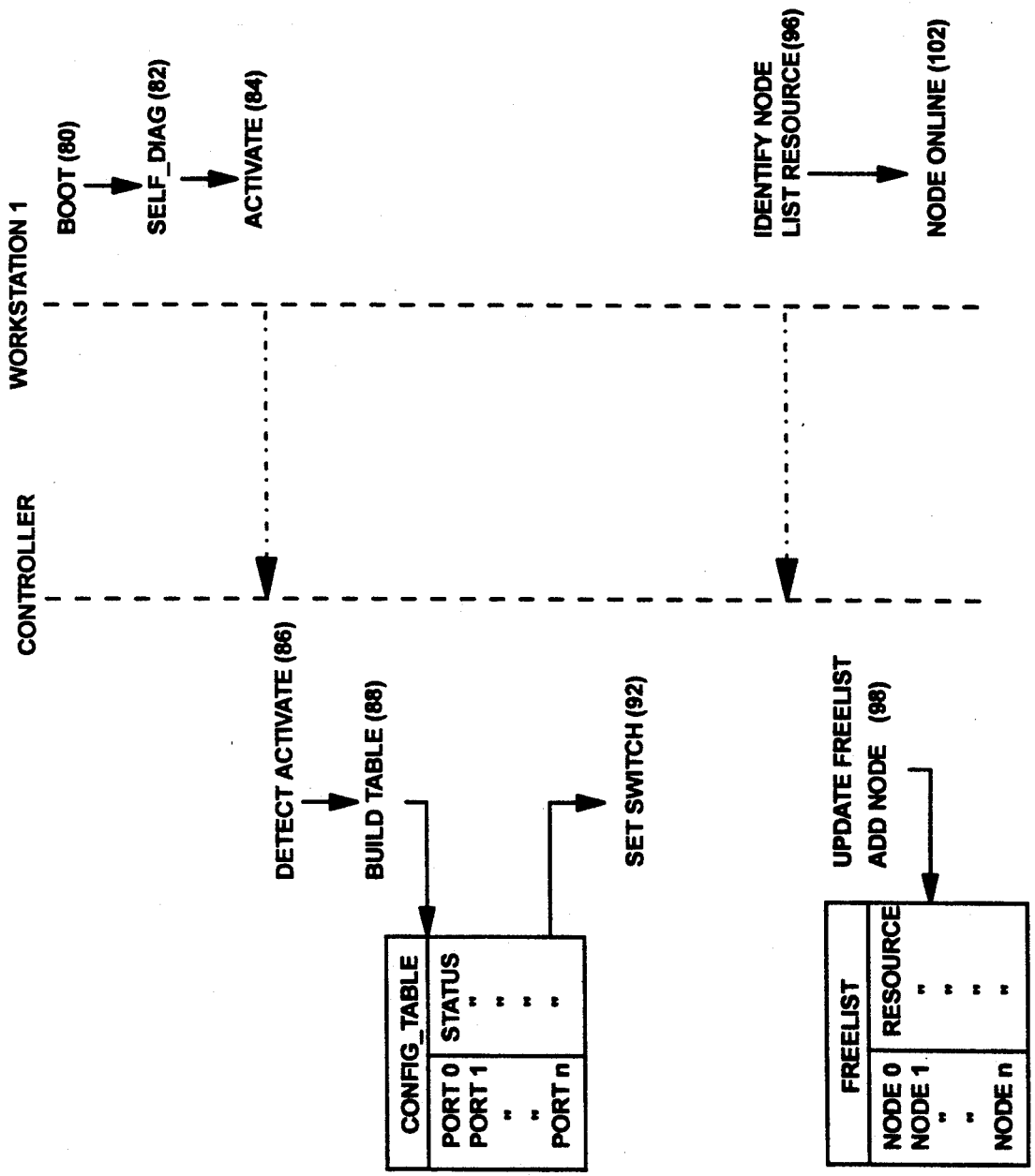
FIG. 3 is a flow chart showing the network log-in process.

FIG. 3 illustrates a flow chart having greater detail of the network configuration processes. In particular, it illustrates the interactive log-in process between a node and the network controller. For simplicity, the processes and message flows of FIG. 3 are of a single workstation rather than for multiple workstations. At 80 and 82, the workstation boots and runs a self-diagnostic test. At 84, the workstation activates itself with respect to the common ring by modulating its LAN line with a +5 vDC signal. At 86, the network controller detects the modulation. At 88, 90 and 92 the network controller rebuilds its LAN configuration table (CONFIG_TABLE) and reconfigures the common LAN (by setting the switch) so that the workstation is included in the ring. The configuration table (CONFIG_TABLE) is a table stored in memory in which the processor keeps track of the present switch configuration. At 96, the workstation identifies to the network controller its physical node address and the resource, if any, it can provide to the network. A laser disk player is an example of a resource. At 98 and 100, the network controller updates its available resource table (FREELIST) with the workstation's information. At 102, the workstation is on-line common LAN.

FIG. 4 illustrates the interactive log-out process for removing a node from the common network. At 103, the node is on-line. At 104, the node notifies the network controller that it wishes to be logged out. At 106 and 108, the network controller rebuilds its LAN configuration table, deactivating the requesting node. At 110, the network controller confirms the log-out with the node. At 112, the node becomes inactive and goes off-line at 113. At 114, the network controller sets switch to the new configuration, removing the node from the common ring. At 116 and 118, the network controller updates its available resource list (FREELIST), removing the node therefrom.

FIG. 5 is a flow chart showing in detail the process involved in establishing a private session between two nodes when the nodes are on-line common LAN. At 119, both nodes are on-line common LAN. At 120, workstation 1 (Client) requests to the network controller that a private session be established between workstation 1 (Client) and workstation 2 (Server). At 122, the network controller checks the FREELIST and to determine whether Server is available. If so, at 124, the network controller reserves the resource (Server) by removing it from the FREELIST. At 126, the network controller issues a notification to both workstation 1 and workstation 2 that a private session is impending. At 128, upon receiving the notification, both workstation 1 and workstation 2 deactivate by dropping their +5 vDC signals, indicating that they are ready for the private session. The controller detects the signal drop at 130 and reconfigures the network by building a CONFIG_TABLE (a table specifying the new switch configuration) at 132 and by setting the switch at 134. After a predetermined period of time, workstation 1 and workstation 2 reactivate at 136 by raising the +5 vDC signal and begin private communication at 137. At 138, the controller detects this as a successful establishment of the private session. If either workstation 1 or workstation 2 does not reactivate, the controller will take them completely out of the network until each reactivates.

FIG. 6 illustrates a flow chart showing the process by which a private session is broken by one of the parties in the private session. Initially, at 140, workstation (WS) 1 and WS2 have an established private session. At 142, WS1 requests that the session be ended. At 146, each node deactivates by dropping its +5 vDC line. The controller detects the +5 vDC drops at 148 and checks the configuration table at 150 to determine whether the nodes were having a private session. At 152, it is determined that there was a private session so the controller waits for the nodes to reactivate by raising the +5 vDC line. If, after a predetermined period of time, the nodes do not reactivate, the processor removes them completely from the private and common rings. At 156, both nodes reactivate. At 158, the controller builds a new configuration table having the nodes back in the common ring. The controller then sets the switch at 160 so that the nodes are back on-line on common LAN. At 164, the controller updates the FREELIST and, at 166, notifies the nodes that they are on-line common LAN.

In the present example, one controller has been described as controlling the configuration of a single LAN. Other scenarios can exist, however, where multiple controllers may be utilized to control the configuration and interconnection of multiple LANs and multiple subLANs with additional MAUs. The different utilizations are nearly endless.

While the invention has been particularly shown and described with reference to preferred embodiments thereof, it will be understood by those skilled in the art that various other changes in form and detail may be made without departing from the spirit and scope of the invention.

I claim:

1. A network controller connected to a plurality of nodes in a common network for dynamically reconfiguring said network, said network controller comprising:

a switching device connected to said plurality of nodes for connecting each node to at least another node for direct transmission of data therebetween on said common network, said switching device being responsive to one or more control signals; and means for providing said one or more control signals to said switching device for establishing a second network comprising a first node and at least one other node upon receiving an establish request from said first node and for concurrently re-establishing said common network comprising the nodes of said common network not included in said second network.

2. The network controller defined in claim 1 further comprising means for receiving a disconnect request from said first node for disconnecting said first node from said second network, means for receiving a connect request for connecting said first node in said common network, and means for providing said one or more control signals to said switching device for establishing said common network including said first node.

3. The network controller defined in claim 2 wherein said disconnect request receiving means comprises signal detection circuitry for detecting a predetermined signal modulation representing said request for network disconnection from said first node.

4. The network controller defined in claim 3 wherein said switching device has means for receiving data transmission lines from said nodes, said disconnect request receiving means having means for being connected to at least some of said lines.

5. The network controller defined in claim 4 wherein said signal detection circuitry has means for detecting a direct current (DC) variation on said node data transmission lines.

6. The network controller defined in claim 1 wherein said switching device is a cross-bar switch.

7. The network controller defined in claim 1 further comprising means for determining whether said at least one other node is available for use.

8. A method of configuring a network having a plurality of nodes directly interconnected by a switch, said method comprising the steps of:
 establishing said network in an initial common configuration including each of said nodes;
 receiving an establish request from a first node in said common configuration for establishing a second network comprising said first node and at least one other node; and
 reconfiguring said switching device for establishing said second network comprising said first node and said at least one other node and for concurrently re-establishing said common configuration comprising the nodes of said common configuration not included in said second network.

9. The method of configuring a network defined in claim 8 further comprising the steps of receiving a disconnect request from said first node for disconnecting said first node from said second network, receiving a connect request for connecting said first node in said common configuration, and providing said one or more control signals to said switching device for establishing said common configuration including said first node.

10. The method of configuring a network defined in claim 9 further comprising the steps of receiving a connect request from said at least one other node for connecting said at least one other node in said common configuration and providing said one or more control signals to said switching device for establishing said common configuration including said at least one other node.

11. The method of configuring a network defined in claim 8 further comprising the steps of receiving from said plurality of nodes node identification information and building a table comprising said node identification information.

12. The method of configuring a network defined in claim 9 wherein said nodes are connected to said switching device by data transmission lines and further wherein said step of receiving a disconnect request from said first node for disconnecting said first node from said second network comprises detecting a direct current (DC) variation in one of said data transmission lines from said first node.

13. The method of configuring a network defined in claim 8 further comprising the step of determining whether said at least one other node is available for use.

14. A network comprising:
 a plurality of nodes;
 a network controller connected to said plurality of nodes in a common network for dynamically reconfiguring said network, said network controller comprising:
 a switching device connected to said plurality of nodes for connecting each node to at least another node for direct transmission of data therebetween on said common network, said switching device being responsive to one or more control signals; and
 means for providing said one or more control signals to said switching device for establishing a second network comprising a first node and at least one other node upon receiving an establish request from said first node and for concurrently re-establishing said common network comprising the nodes of said common network not included in said second network.

15. The network defined in claim 14 wherein said network controller further comprises means for receiving a disconnect request from said first node for disconnecting said first node from said second network, means for receiving a connect request for connecting said first node in said common network, and means for providing said one or more control signals to said switching device for establishing said common network including said first node.

16. The network defined in claim 15 wherein said disconnect request receiving means comprises signal detection circuitry for detecting a predetermined signal modulation representing said request for network disconnection from said first node.

17. The network defined in claim 16 wherein said switching device has means for receiving data transmission lines from said nodes, said disconnect request receiving means having means for being connected to at least some of said lines.

18. The network defined in claim 17 wherein said signal detection circuitry has means for detecting a direct current (DC) variation on said node data transmission lines.

19. The network defined in claim 14 wherein said switching device is a cross-bar switch.

20. The network defined in claim 14 wherein said network controller further comprises means for determining whether said at least one other node is available for use.

* * * * *